US010956528B2

(12) United States Patent
Saxena

(10) Patent No.: US 10,956,528 B2
(45) Date of Patent: Mar. 23, 2021

(54) AUTOMATIC DETECTION OF POINT OF INTEREST CHANGE USING COHORT ANALYSIS

(71) Applicant: Uber Technologies, Inc., San Francisco, CA (US)

(72) Inventor: Vikram Saxena, Cupertino, CA (US)

(73) Assignee: Uber Technologies, Inc., San Francisco, CA (US)

( * ) Notice: Subject to any disclaimer, the term of this patent is extended or adjusted under 35 U.S.C. 154(b) by 289 days.

(21) Appl. No.: 15/993,328

(22) Filed: May 30, 2018

(65) Prior Publication Data

US 2019/0370349 A1 Dec. 5, 2019

(51) Int. Cl.
*G06F 16/9535* (2019.01)
*G06F 16/9537* (2019.01)
*G06F 16/29* (2019.01)
*G06F 16/28* (2019.01)
*G06F 16/23* (2019.01)
*G06F 16/9032* (2019.01)
*G06F 16/2457* (2019.01)

(52) U.S. Cl.
CPC ...... *G06F 16/9537* (2019.01); *G06F 16/2379* (2019.01); *G06F 16/285* (2019.01); *G06F 16/29* (2019.01); *G06F 16/9535* (2019.01); *G06F 16/24578* (2019.01); *G06F 16/90324* (2019.01)

(58) Field of Classification Search
CPC ......... G06F 16/24578; G06F 16/90324; G06F 16/9535
See application file for complete search history.

(56) References Cited

U.S. PATENT DOCUMENTS

| 2009/0006297 A1* | 1/2009 | Horvitz | G06N 20/00 706/46 |
| 2013/0246146 A1* | 9/2013 | Fischer | G06Q 20/209 705/14.23 |
| 2015/0073875 A1* | 3/2015 | Rahman | G06Q 50/01 705/7.39 |
| 2015/0242419 A1* | 8/2015 | Holmquist | G06F 16/9537 707/706 |
| 2018/0188058 A1* | 7/2018 | Dabholkar | G01C 21/3679 |

OTHER PUBLICATIONS

Glaesser et al., "Global Travel Patterns: an overview", 2017, Department of Sustainable Development of Tourism, World Tourism Organization (UNWTO). (Year: 2017).*

* cited by examiner

*Primary Examiner* — Sheryl L Holland
(74) *Attorney, Agent, or Firm* — Schwegman Lundberg & Woessner, P.A.

(57) ABSTRACT

Systems and methods for maintaining a current database of point of interest (POI) by automatically detecting a change associated with a POI based on cohort analysis are provided. A networked system accesses trip data associated with the POI. Using the analyzed trip data, the networked system generates a cohort associated with the POI. The networked system monitors for, and detects a change in, trip behavior in the cohort associated with the POI. In response to detecting the change in trip behavior, the networked system updates a database in a data store to indicate a status update.

20 Claims, 9 Drawing Sheets

AUTOMATIC DETECTION OF POINT OF INTEREST CHANGE USING COHORT ANALYSIS

TECHNICAL FIELD

The subject matter disclosed herein generally relates to special-purpose machines configured to the technical field of detecting a change associated with a point of interest (POI), and to the technologies by which such special-purpose machines become improved compared to other similar special-purpose machines. Specifically, the present disclosure addresses systems and methods to maintain a current database of POI by automatically detecting a status change associated with a POI (e.g. closed POI, moved POI, new POI) using cohort analysis.

BACKGROUND

Various systems maintain a catalog of points of interest (POI) that include a name, address, and in some cases, a geographic coordinate. A constant challenge in maintaining such a catalog is that the POI may often close or move. In these situations, an update of the catalog is often slow to manifest, or the catalog may never be updated as conventional systems have difficulties in detecting the closure or moving of a POI.

BRIEF DESCRIPTION OF THE DRAWINGS

Some embodiments are illustrated by way of example and not limitation in the figures of the accompanying drawings.

DETAILED DESCRIPTION

Figure 1:
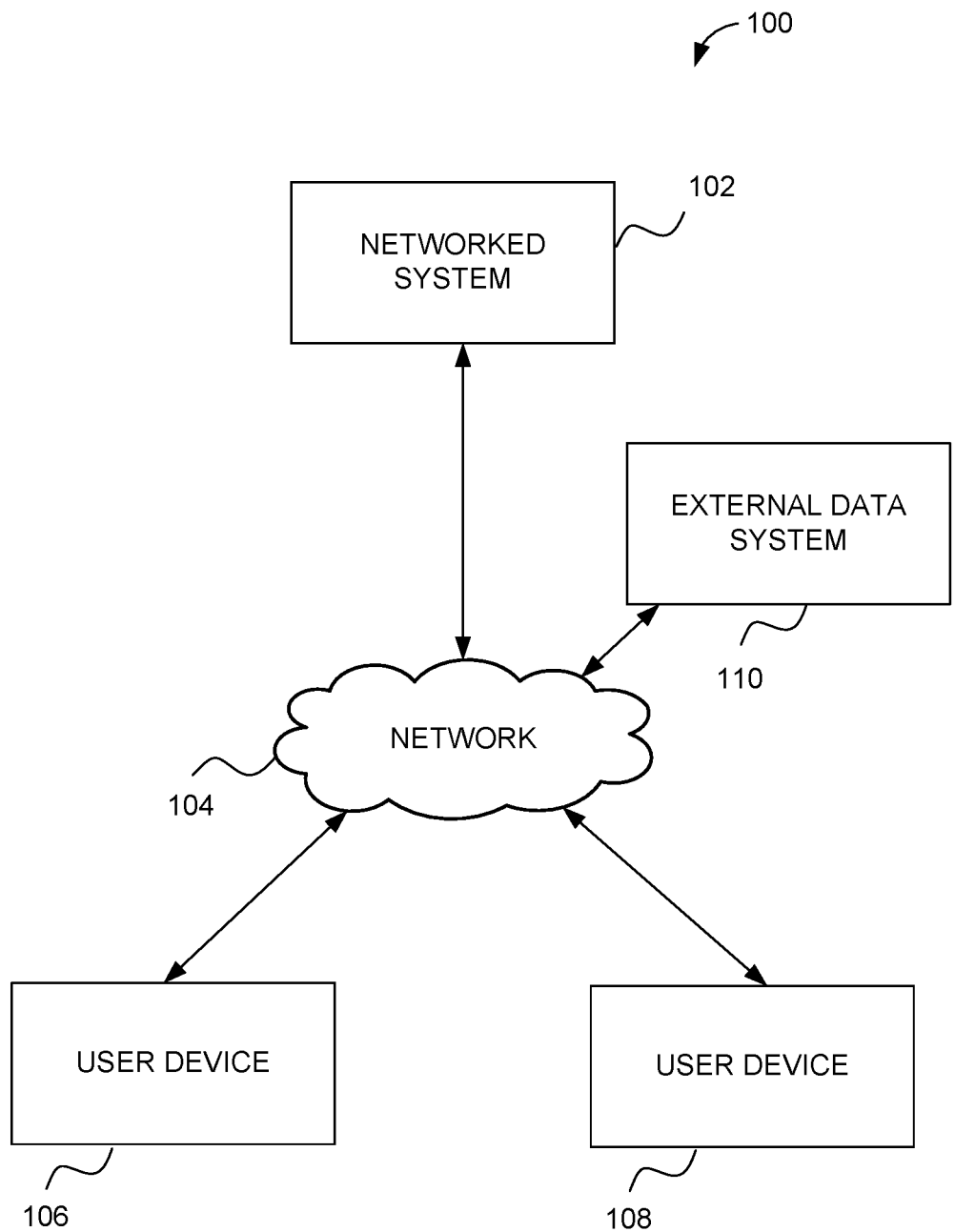
FIG. 1 is a diagram illustrating a network environment suitable for automatically detecting a point of interest (POI) status change, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The present disclosure provides technical solutions for maintaining a current database of POI by automatically detecting a status change associated with a POI based on cohort analysis, and causing an automatic update to a database in response to the detected status change. In example embodiments, the technical solution involves systems and methods that analyze trip data, generate cohorts associated with each POI, and monitor trip behavior of the cohorts associated with each POI. The systems and methods automatically detect when a change in trip behavior of the cohort associated with a POI occurs. Each cohort is a group of users having a shared common characteristic or experience (e.g., traveling to the same POI). In response to detecting the change in trip behavior, a status change for the POI is determined and a database updated accordingly.

In example embodiments, the trip data comprises information pertaining to a service provided between a pick-up location (PU) and a drop-off location (DO). The service may comprise a transportation service or a delivery service (e.g., food or goods delivery). In some embodiments, a networked system generates, using the trip data, a cohort associated with a POI by grouping users that frequently (e.g., exceeds a frequency threshold) travel to the same POI. The networked system monitors and detects a change in the trip behavior of the cohort associated with the POI (e.g., a percentage of the cohort stops traveling to the POI) over time. In some embodiments, the networked system monitors and detects whether a threshold percentage of the cohorts is traveling to a second location. If the users in the cohort appear to have just stopped going to the POI and no threshold percentage is traveling to other locations, then the networked system flags the POI as being closed. However, if a threshold percentage of the cohort is traveling to a second location, the networked system determines whether the second location is associated with a new location for the POI (e.g., the POI has moved) or a new POI in a same category as the existing POI (e.g., a competing business). For example, the existing POI is an Italian restaurant, and the new POI is a new Italian restaurant that is drawing some customers away from the existing POI. The networked system makes this determination based, in part, on whether a portion of the cohort is still traveling to the location corresponding to the (existing) POI, which would indicate that the (existing) POI is still open.

In some embodiments, a verification process is triggered to verify the status of the POI (e.g., whether the POI has moved or closed; whether a new POI has opened that is now drawing some of the users away from the POI). The verification process, in some embodiments, comprises use of user generated content. In particular, a user interface is caused to be presented on a user device of a user that is tied to the POI (e.g., part of the cohort associated with the POI; has traveled to POI in the past). For example, the user may be a driver or a rider that frequently traveled to the POI. Additionally or alternatively, the verification process can include use of an external data source (e.g., a website of the POI; publicly accessible business registration data) for verification or include physical in-person verification.

Thus, example methods (e.g., algorithms) and example systems (e.g., special-purpose machines) are configured to automatically detect a status change in a POI using cohort analysis and to automatically update a database with the status change. In particular, example embodiments provide mechanisms and logic that utilizes cohort analysis applied to trip data associated with a POI in order to determine if a status change in the POI has occurred (e.g., moved, new location) or if a competing new POI has opened. In some embodiments. The mechanisms and logic verify the detected change either before or after the database is updated with the detected change. As a result, one or more of the methodologies described herein facilitate solving the technical problem of improving the accuracy of POI data, and more specifically improving accuracy of a location of the POI and verifying whether the location is open, closed, or moved, or whether a new competing business has opened. This is important when, for example, a user performs a search for the POI by name, instead of address. If a wrong address is associated with the POI in the database, erroneous information is returned, and the user may be directed to a wrong location. Other technical advantages include reducing the amount of non-relevant data that is stored in a data storage as well as providing quicker access to accurate data because the data is current and not stale.

FIG. 1 is a diagram illustrating a network environment 100 suitable for maintaining a current database of POI by automatically detecting a status change associated with a POI using cohort analysis, according to example embodiments. The network environment 100 includes a networked system 102 communicatively coupled via a network 104 to a plurality of user devices 106 and 108. In example embodiments, the networked system 102 comprises components that obtain, store, and analyze trip data in order to generate cohorts associated with each POI, monitor trip behavior of the cohorts over time, detect a change in trip behavior, and trigger processes in response to detecting the change in trip behavior including determining a status change for the POI. The triggered processes also include automatically updating a database in a data store based on the detected trip behavior change and determined status. The triggered processes also may include a verification process whereby, in some embodiments, one or more users at the user device 106 or 108 are presented user interfaces requesting verification of a location or whether the location is closed or new. The components of the networked system 102 are described in more detail in connection with FIG. 2 and may be implemented in a computer system, as described below with respect to FIG. 7.

The components of FIG. 1 are communicatively coupled via the network 104. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In example embodiments, the user devices 106 and 108 are portable electronic devices such as smartphones, tablet devices, wearable computing devices (e.g., smartwatches), or similar devices. Alternatively, the user device 108 can correspond to an on-board computing system of a vehicle. The user devices 106 and 108 comprise one or more processors, memory, touch screen displays, wireless networking system (e.g., IEEE 802.11), cellular telephony support (e.g., LTE/GSM/UMTS/CDMA/HSDP A), and/or location determination capabilities. The user devices 106 and 108 interact with the networked system 102 through client applications stored thereon. The client applications of the user devices 106 and 108 allow for exchange of information with the networked system 102 via user interfaces. The client applications running on the user devices 106 and 108 may also determine location information of the user devices 106 and 108 (e.g., latitude and longitude for a pick-up or a drop-off of a trip), and provide the location information to the networked system 102 for storage as part of the trip data. The trip data is used by the networked system 102 to generate the cohorts, and analyzed to detect trip behavior changes that signify a change in a POI status (e.g., moved, closed).

In example embodiments, a user operates the user device 106 that executes the client application (e.g., not shown) to communicate with the networked system 102 to make a request for transport or delivery service (referred to collectively as a "trip"). In some embodiments, the client application determines or allows the user to specify a pick-up location (e.g., of the user or an item to be delivered) for the trip. For example, the pick-up location may be an address or name of a location inputted by the user on a user interface provided via the client application, or the pick-up location corresponds to a current location of the user device 106 as automatically determined by a location determination module in the user device 106 (e.g., a global positioning system (GPS) component). In some embodiments, the networked system 102 recommends the pick-up location or drop-off location based on historical trip data associated with the user. In example embodiments, the client application provides a current location (e.g., coordinates such as latitude and longitude) of the user device 106 to the networked system 102. The client application also presents information, from the networked system 102 via user interfaces, to the user of the user device 106, such as address verification requests (e.g., query to verify a status of the POI).

A second user operates the user device 108 to execute a client application that communicates with the networked system 102 to exchange information associated with providing transportation or delivery service to the user of the user device 106. The client application presents information via user interfaces to the user of the user device 108, such as invitations to provide transportation or delivery service, navigation/routing instructions, and attribute verification requests (e.g., query to verify a new address for a moved POI). The client application also provides a current location (e.g., coordinates such as latitude and longitude) of the user device 108 to the networked system 102, whereby the current location may comprise a pick-up location, drop-off location, or a position on a route traveling to the POI. Depending on implementation, the current location may be a location corresponding to the current location of the user device 108 as determined automatically by a location determination module in the user device 108. In example embodiments, the pick-up location or drop-off location corresponds to an address for a POI and is associated with coordinates (e.g., latitude and longitude) based on a location of one or more of the user devices 106 and 108 when a trip starts and/or when the trip is completed.

The external data system 110 comprises external data (e.g., public domain data external to the networked system 102) regarding POIs. The external data from the external data system 110 can be used (e.g., by an operator or machine of the networked system 102) to verify an attribute, such as status, for a POI determined by the networked system 102. For example, the external data may correspond to a website of a business located at the POI. The information from the website can be used to verify whether a POI is closed or moved, or whether the POI is a new business during a verification process. In another example, the external data may comprise a public directory (e.g., white pages) or publicly accessible records (e.g., business registration data) that indicates names, addresses, or other attributes for the POI.

In example embodiments, any of the systems, machines, databases, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or devices illustrated in FIG. 1 may be combined into a single system or device, and the functions described herein for any single system or device may be subdivided among multiple systems or devices. Additionally, any number of user devices 106 and 108 may be embodied within the network environment 100. Furthermore, some components or functions of the network environment 100 may be combined or located elsewhere in the network environment 100. For example, some of the functions of the networked system 102 may be embodied within other systems or devices of the network environment 100. While only a single networked system 102 is shown, alternative embodiments may contemplate having more than one networked systems 102 to perform server operations discussed herein for the networked system 102.

Figure 2:
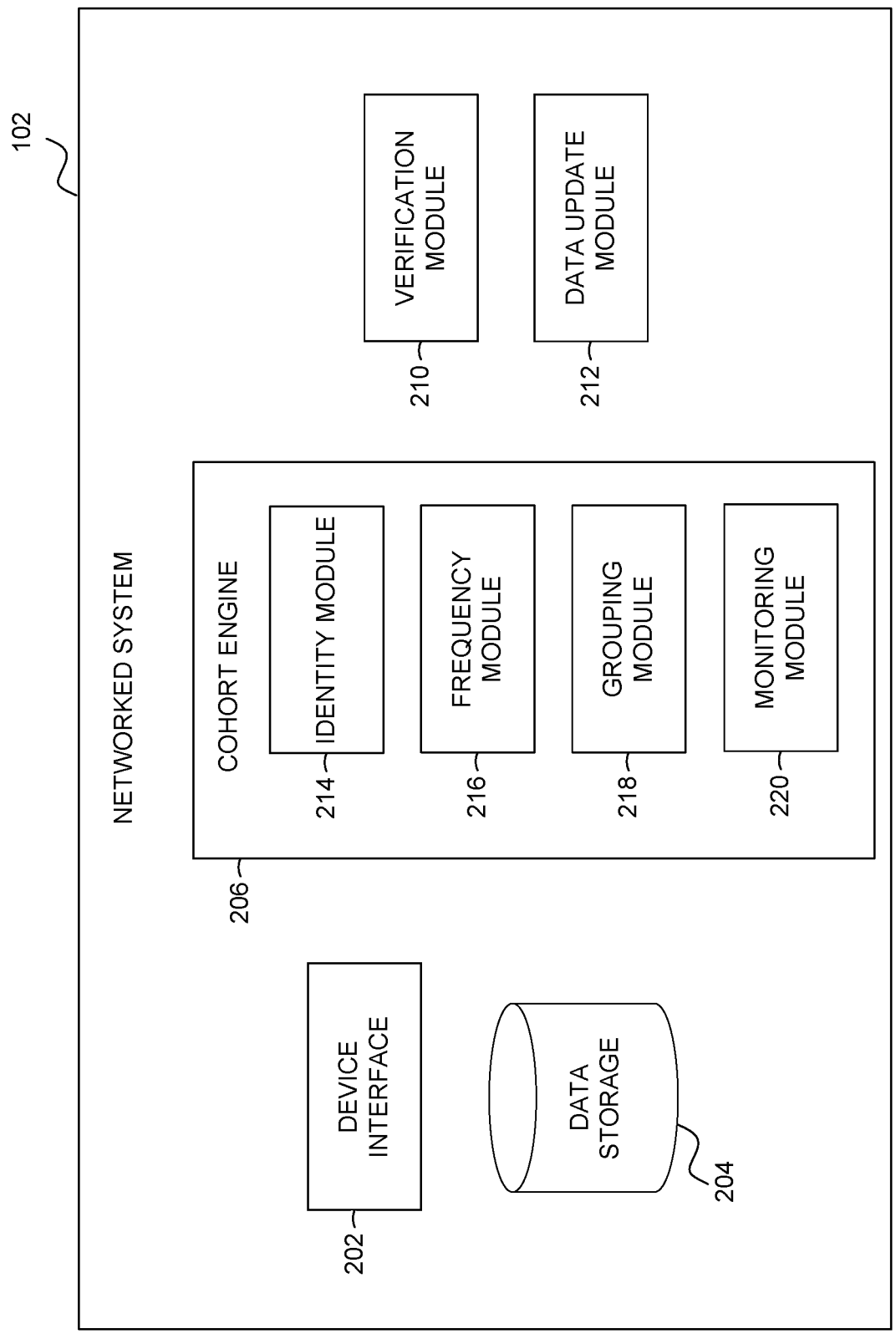
FIG. 2 is a block diagram illustrating components of a networked system, according to some example embodiments.

FIG. 2 is a block diagram illustrating components of the networked system 102, according to some example embodiments. In various embodiments, the networked system 102 obtains and stores trip data, generates a cohort associated with each POI, monitors and performs analysis to detect a trip behavior change in the cohort associated with a POI, and updates data structures (e.g., a database) of a data storage if trip behavior change exceeds one or more thresholds indicating a status change for the POI. In some embodiments, the networked system 102 also performs a verification process to verify the status change (e.g., that the POI is closed or has moved, or that a new POI is open). To enable these operations, the networked system 102 comprises a device interface 202, a data storage 204, a cohort engine 206, a verification module 210, and a data update module 212 all configured to communicate with each other (e.g., via a bus, shared memory, or a switch). The networked system 102 may also comprise other components (not shown) that are not pertinent to example embodiments. Furthermore, any one or more of the components (e.g., engines, interfaces, modules, storage) described herein may be implemented using hardware (e.g., a processor of a machine) or a combination of hardware and software. Moreover, any two or more of these components may be combined into a single component, and the functions described herein for a single component may be subdivided among multiple components.

The device interface 202 is configured to exchange data with the user devices 106 and 108 and cause the presentation of one or more user interfaces on the user devices 106 and 108. In example embodiments, the device interface 200 generates and transmits instructions (or the user interfaces themselves) to the user devices 106 and 108 to cause the user interfaces to be displayed on the user devices 106 and 108. The user interfaces can be used to request transport or delivery service from the user device 106, display invitations to provide the service to the user device 108, present navigation instructions to the user device 108, and present verification queries. The device interface 200 also receives information such as locations (e.g., latitude and longitude) from the user devices 106 and 108, touch inputs, and other trip information from the user devices 06 and 108 (e.g., route taken, trip ratings). At least some of the information received from the user devices 106 and 108 are stored to the data storage 204 as trip data.

The data storage 204 is configured to store various data used by the networked system 102 to perform the cohort analysis. For example, the data storage 204 stores trip data which comprises information pertaining to trips from a pick-up location to a drop-off location including names of POI, addresses, and/or coordinates (e.g., longitude and latitude). The data storage 202 may also stores cohort information (e.g., members of the cohort), trip behavior data (e.g., number of trips to a particular POI for each period of time), and various thresholds used to create cohorts and monitor for change in trip behavior, as will be discussed in more detail below.

The cohort engine 206 is configured to analyze the trip data to generate a cohort associated with a POI, to monitor trip behavior of the cohort, to detect a change in trip behavior, and to determine a status change based on the change in trip behavior. As such, the cohort engine 206 periodically accesses trip data stored in the data storage 204. In example embodiments, the cohort engine 202 comprises an identity module 214, a frequency module 216, a grouping module 218, and a monitoring module 220.

The identity module 214 identifies, from the trip data, a particular POI and each user that travels to or from the POI. Accordingly, the identity module 214 accesses, from the data storage 204, trip data associated with each POI. For example, trip data may indicate that the POI was a drop-off location or pick-up location of a trip. The trip data for a trip involving the POI comprises a set of data that may include an address or latitude/longitude (also referred to herein as "coordinates"), name of the POI, users traveling to or from the POI, and a timestamp for the trip (e.g., time when the trip began or time when the trip is completed). The identity module 214 examines the trip data for the name of the POI and/or address of the POI. If a POI (e.g., a pick-up location or drop-off location) does not have a name or address associated with it, the identify module 214 ties the POI to a latitude/longitude or a specific cell. A cell is a particular area such as, for example, a building or a half city block. The user is identified as the user of the client application on the user device 106 or 108 that was used to request or provide the transportation service.

The frequency module 216 determines whether each user identified by the identity module 214 is a "frequent traveler" to the POI by determining whether each user has traveled to or from the POI at a frequency above a frequency threshold. For example, if the user travels to the POI at least once a week for the past month, the user may be considered to satisfy the frequency threshold. In example embodiments, the frequency threshold may be a default, set by an administrator of the networked system 102, or machine learned. In some embodiments, the frequency threshold is stored in the data storage 204.

The grouping module 218 is configured to generate the cohort associated with each POI. In example embodiments, the grouping module 218 takes all the users determined by the frequency module 216 to have transgressed the frequency threshold and "tie" these users to the POI. The grouping module 218 subsequently groups the users tied to the same POI together to form a cohort. As such, the grouping module 218 is configured to group users by POIs that the users frequently travel to or from. Data regarding the cohort (e.g., the users in the cohort) may be stored to the data storage 204.

The monitoring module 220 monitors trip behavior of each cohort. In example embodiments, the monitoring module 220 accesses the stored trip data from the data storage 204. Using the trip data, the monitoring module 220 tracks, over time, trips by members of the cohort including trips to/from the POI as well as other locations. In some embodiments, the monitoring may be time based. For example, if users in the cohort typically travel to a work location every weekday morning but suddenly start traveling to a different location at approximate the same time, this may be flagged by the monitoring module 220. The monitoring module 220 may log (e.g., store to the data storage 204) the number of trips and locations of the trips for the cohort.

The monitoring module 220 further determines whether the trip behavior of the cohort has changed over a given period of time. If the trip behavior has changed, the monitoring module 220 analyzes the trip behavior change to determine a status of the POI (e.g., the POI has closed or moved; a new competing POI has opened). Accordingly, the monitoring module 220 determines whether the trip behavior (e.g., frequency of trips by the cohorts over time) has changed (e.g., been reduced) a threshold number, amount, or percentage (collectively referred to herein as "number"). If the threshold number of users in the cohort have stopped going to the POI, the monitoring module 220 further determines whether the trip behavior shows a threshold percentage of the users in the cohort are traveling to a different location. In these embodiments, the monitoring module 220 further determines whether the different location is a new location for the POI (e.g., the POI has moved) or a competing business. The operations of the monitoring module 220 are discussed in more detail in connection with FIG. 5. In example embodiments, the identification of a new competing POI may trigger the cohort engine 206 to generate a new cohort that is associated with the new competing POI.

Figure 6A:
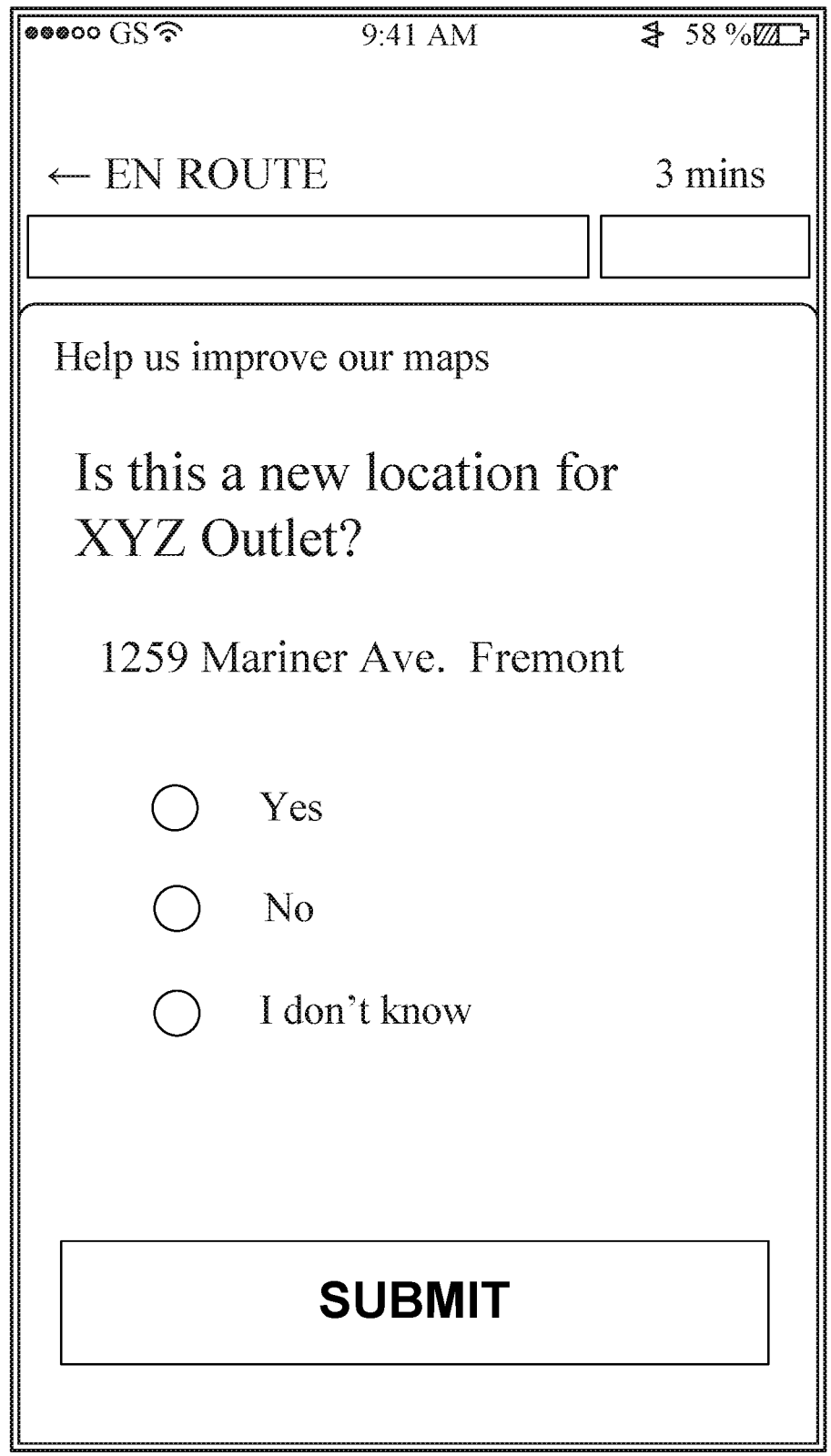
FIG. 6A to FIG. 6C are example user interfaces used to elicit user generated content for verification that a status of a POI has changed.
Figure 6B:
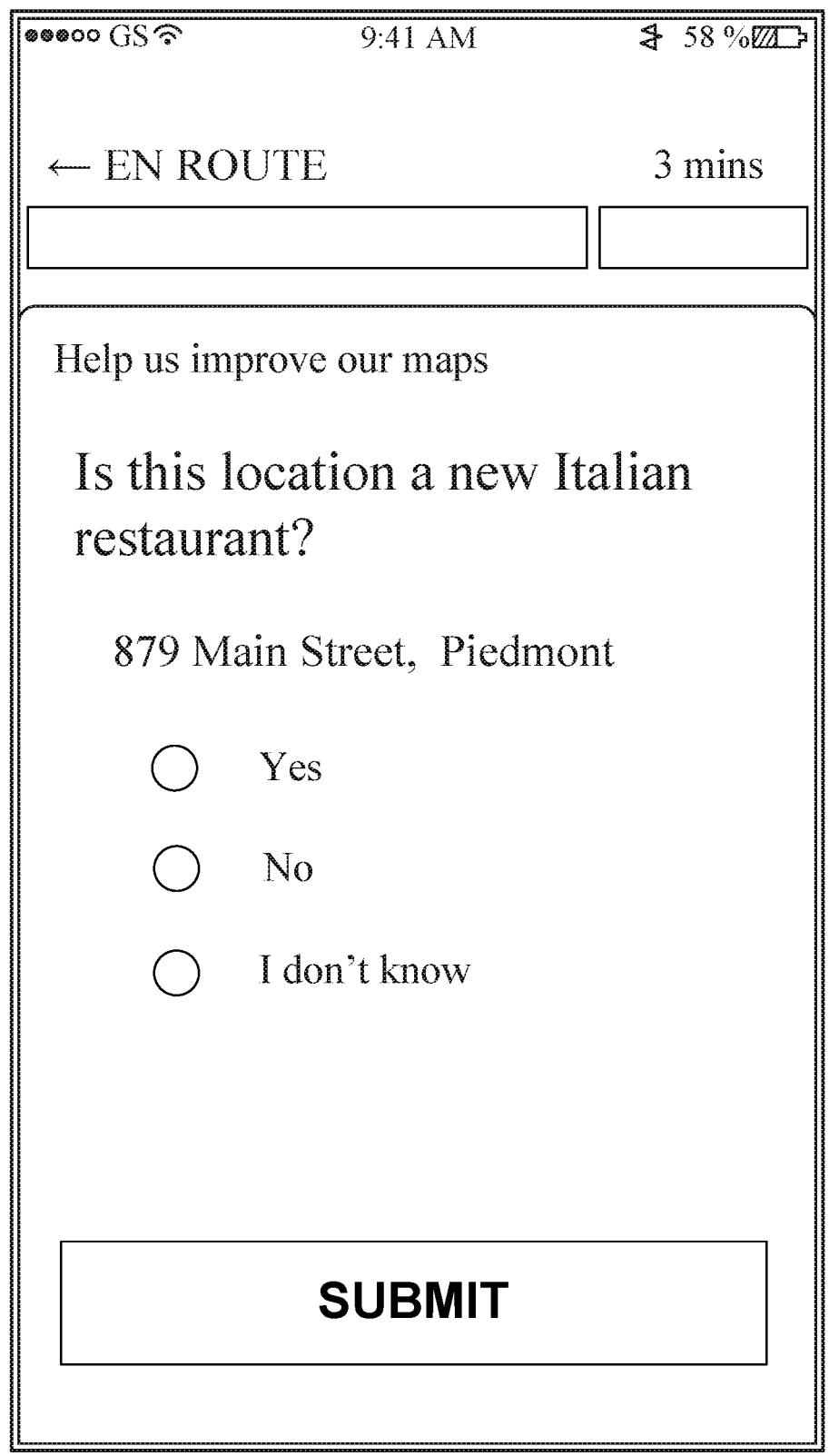
Figure 6C:
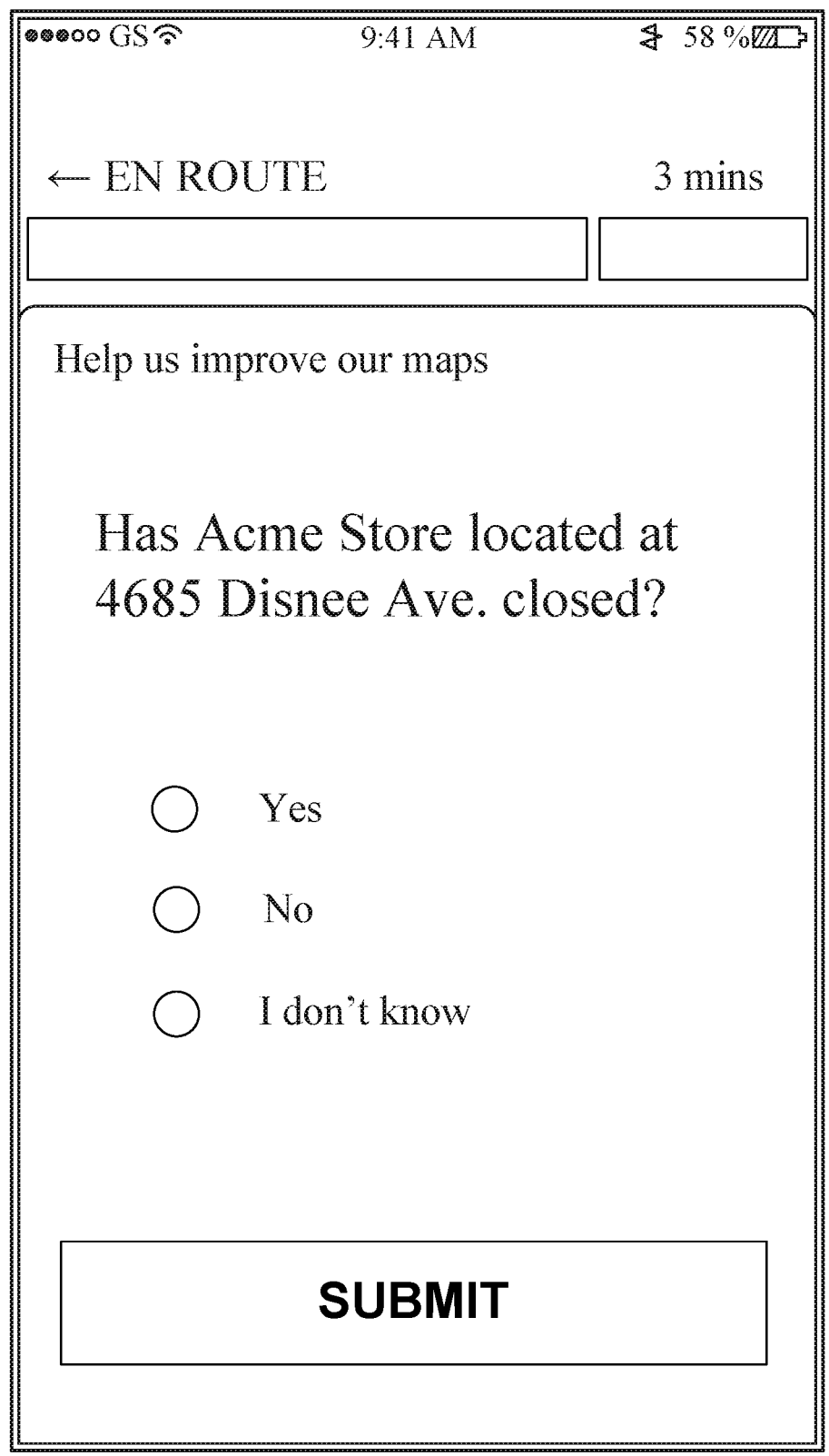

The verification module 210 is configured to manage a verification process in response to the monitoring module 220 determining that trip behavior indicates a status change for the POI. In some embodiment, the verification module 210 triggers presentation of user interfaces to obtain user generated content. Specifically, the verification module 210 generates or causes the generation of a user interface that requests a user associated with the POI to verify the new or changed status for the POI. A response from the user device, via the device interface 202, is received and used to verify the status by the verification module 210. Examples of user interfaces for verifying attributes of POI are shown in FIG. 6A to FIG. 6C.

In some embodiments, the verification module 210 transmits the status of the POI to an operator system, whereby an operator of the operator system verifies the status, for example, by using the external data from the external data system 110. The external data may comprise any public domain data such as a website linked to the POI.

The data update module 212 automatically updates the database in the data storage 204 for the POI. The update may comprise indicating that the POI is now closed, indicating that the POI has moved to a new location and including new location information (e.g., new address or latitude/longitude), or indicating that a new competing business has opened and including information for the new competing business (e.g., name, location). As a result, if a user later searches for a POI that is closed, the networked system 102 can provide an indication that the POI has closed or simply does not show any results.

Figure 3:
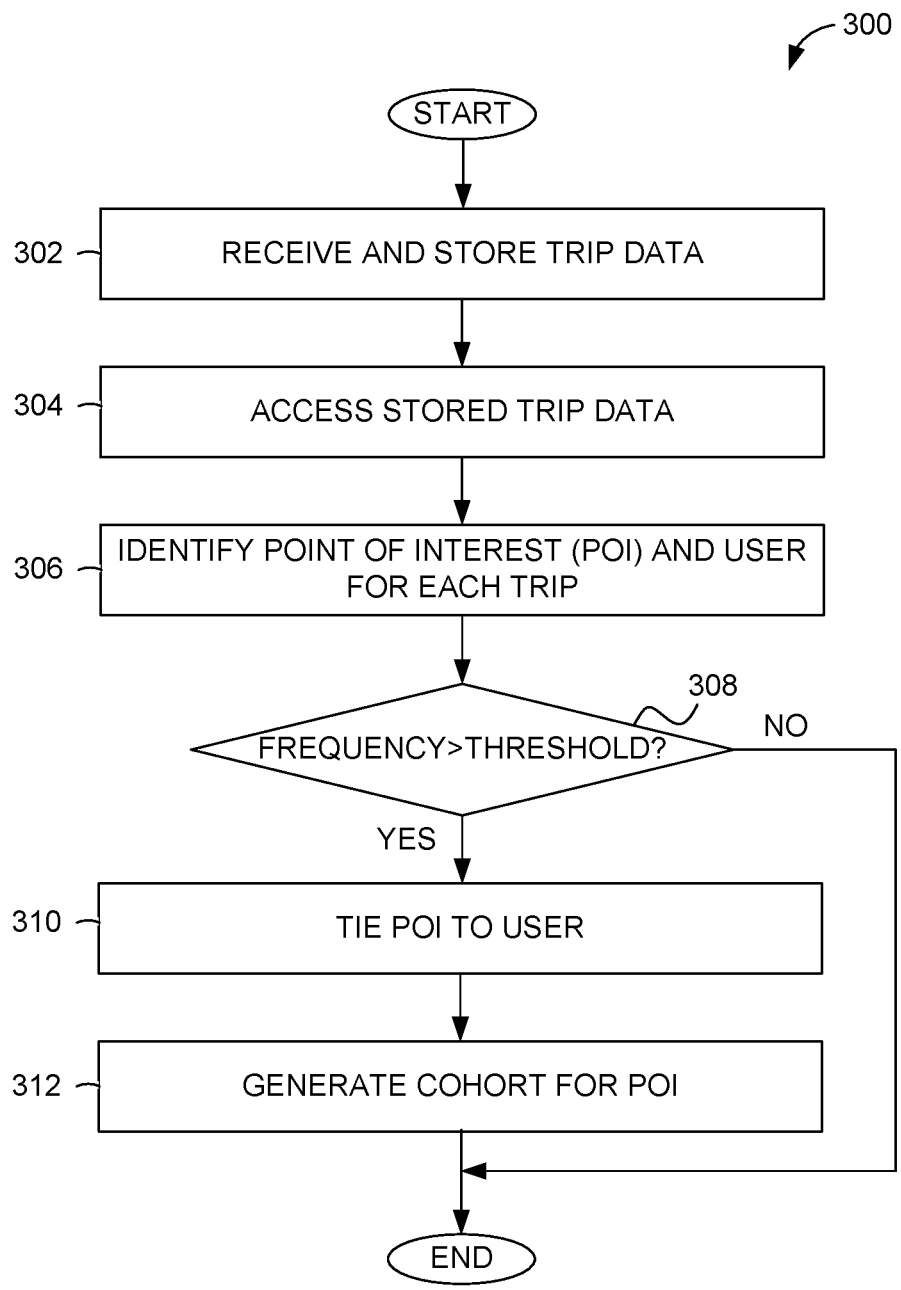
FIG. 3 is a flowchart illustrating operations of a method for generating a cohort, according to some example embodiments.

FIG. 3 is a flowchart illustrating operations of a method 300 for generating a cohort, according to some example embodiments. Operations in the method 300 may be performed by the networked system 102, using components (e.g., cohort engine 206) described above with respect to FIG. 2. Accordingly, the method 300 is described by way of example with reference to the networked system 102. However, it shall be appreciated that at least some of the operations of the method 300 may be deployed on various other hardware configurations or be performed by similar components residing elsewhere in the network environment 100. Therefore, the method 300 is not intended to be limited to the networked system 102.

In operation 302, trip data is received and stored as trip data. In example embodiments, the device interface 202 receives an address or coordinates (e.g., latitude and longitude) from the user device 106 indicating a potential trip (e.g., in a trip request) as well as during a trip (e.g., when a pick-up occurs, when the trip is completed, and along a route). The address or coordinates may correspond to a POI that is a pick-up location, drop-off location, or a location when a service is requested. Additionally, other trip data from the trip (e.g., time, duration, cost, length of trip, identity of users) are received. The received trip data for the trip is stored to the data storage 204. The trip data may be received and stored at any time.

In operation 304, the stored trip data is accessed by the cohort engine 206. In example embodiments, the trip data may be accessed and analyzed periodically. For example, the trip data may be accessed and analyzed nightly or once a week.

In operation 306, the identity module 214 identifies a POI and user associated with each trip from the trip data. The trip data for a trip involving the POI comprises a set of data that may include an address or latitude/longitude, name of the POI, users traveling to or from the POI, and/or a timestamp for the trip (e.g., time when the trip began or time when the trip is completed). The identity module 214 examines the trip data for the name and/or address of the POI. If a POI (e.g., pick-up location or drop-off location) does not have a name or address associated with it, the identify module 214 ties the location to a latitude/longitude or a specific cell. The identity module 214 further identifies the user of the client application on the user device 106 or 108 that was used to request or provide the transportation service associated with the trip data.

In operation 308, a determination is made as to whether the frequency of trips for each user is greater than a frequency threshold for the POI. In example embodiments, the frequency module 216 determines whether each user identified in operation 306 has traveled to or from the POI at a frequency above a frequency threshold. If the frequency is greater than the frequency threshold, then the user is tied to the POI in operation 310. Specifically, the grouping module 218 links the user to the POI. The tying or linking may be stored to the data storage 204.

In operation 312, the grouping module 218 generates the cohort associated with the POI by taking the users tied to the POI and grouping these users together to form the cohort. In some embodiments, generating the cohort may include updating a previously existing cohort to include new users that satisfy the frequency threshold. Data regarding the cohort (e.g., the users in the cohort) may be stored to the data storage 204.

In some embodiments, the cohort is updated by removing one or more users. The removal may occur after a longer time frame in order to preserve system accuracy. Thus, for example, in a shorter time frame, a change in behavior within the cohort is relied on for the cohort analysis. In contrast, for a longer time frame, removal may occur if the percentages of users to be removed is small. For instances, if the cohort has 50 users and two users change behavior while others do not, then after a certain threshold period of time, the cohort engine 206 removes the two users. The removal time frame can vary based on a category of the POI (e.g., shorter for a restaurant, longer for a place which people only visit on particular events a few times a year). Over time, the cohort may evolve (e.g., people change jobs, stop going to a favorite place). The cohort engine 206 separates these changes in user behavior from an actual change related to the POI. Thus, the cohort engine 206 may drop users from the cohort if the cohort engine 206 believes (e.g., determines, detects) that the change is not due to change in the POI.

Figure 4:
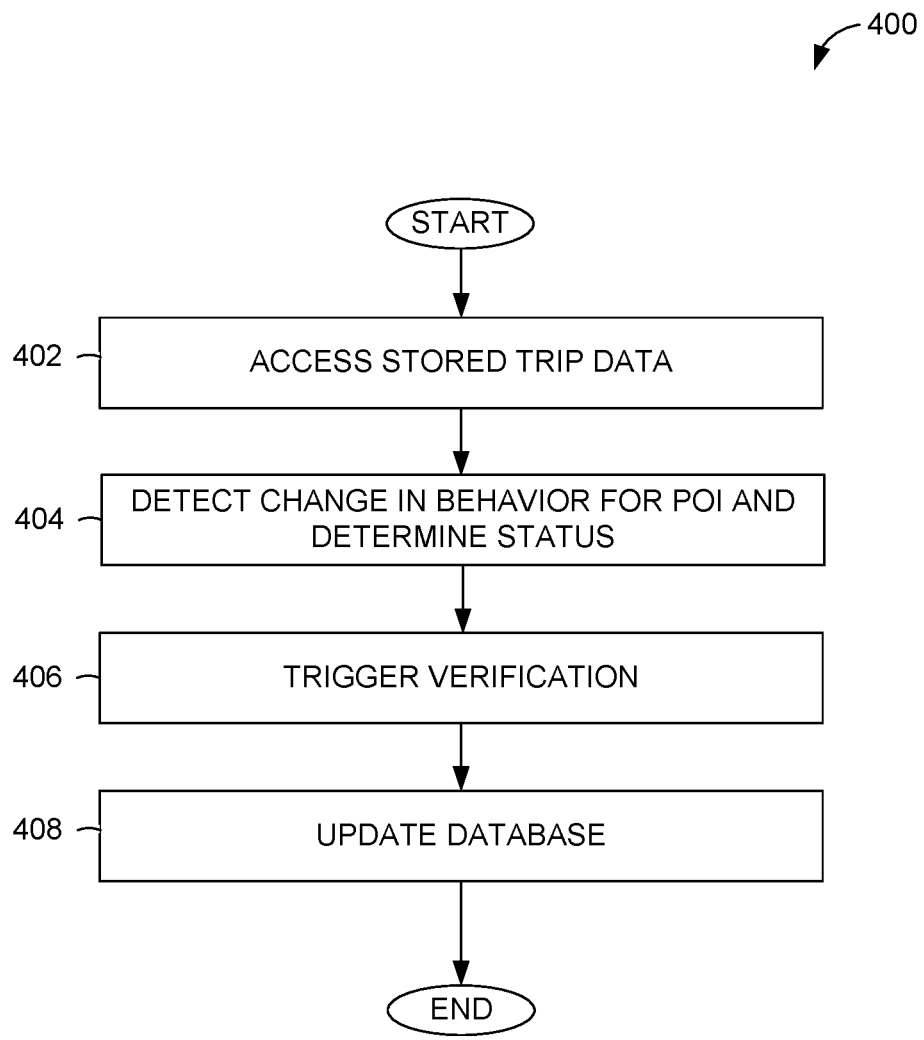
FIG. 4 is a flowchart illustrating operations of a method for maintaining a current database using cohort analysis, according to some example embodiments.

FIG. 4 is a flowchart illustrating operations of a method 400 for maintaining a current database using cohort analysis, according to some example embodiments. Operations in the method 400 may be performed by the networked system 102, using components described above with respect to FIG. 2. Accordingly, the method is described by way of example with reference to the networked system 102. However, it shall be appreciated that at least some of the operations of the method may be deployed on various other hardware configurations or be performed by similar components residing elsewhere in the network environment 100. Therefore, the method is not intended to be limited to the networked system 102.

In operation 402, stored trip data for a POI is accessed by the cohort engine 206. In example embodiments, the trip data may be accessed and analyzed periodically. For example, the trip data may be accessed and analyzed nightly or once a week.

In operation 404, the cohort engine 206 (e.g., the monitoring module 220) detects a change in trip behavior for the POI and determines a status based on a detected change in trip behavior. In some embodiments, the POI is tagged in the database based on the detected change in trip behavior. Operation 404 is discussed in more detail in connection with FIG. 5.

In operation 406, the status identified in operation 404 is verified by the verification module 210. In some embodiment, the verification module 210 triggers presentation of user interfaces to obtain user generated content. In some cases, the verification module 210 generates or causes the generation of a user interface that requests a user traveling to or from the POI (or a user that have traveled to or from the POI in the past) to verify the status for the POI. For example, the user may be an individual operating the user device 106 or 108 that is traveling to the POI. Examples of user interfaces for verifying the attribute are shown in FIG. 6A to FIG. 6C. A response (e.g., user generated content) from the user device 106 or 108 is received via the device interface 202 and used to verify the status by the verification module 210. In some embodiments, the verification module 210 transmits the status to an operator system, whereby an operator (e.g., human or machine operator) of the operator system verifies the status (e.g., using the external data obtained from the external data system 110; physically going to a location of the POI). Further still, the status may be verified using both user generated content and the operator system. In some embodiments, operation 406 is optional or not needed.

In operation 408, the data storage 204 is updated (e.g., by the monitoring module 220 or verification module 210) with a change in status for the POI. In some cases, the data storage 204 is updated with a new status for a new POI. The data storage 204 update may occur before or after the verification process verifies the status, or occurs without the verification process.

Figure 5:
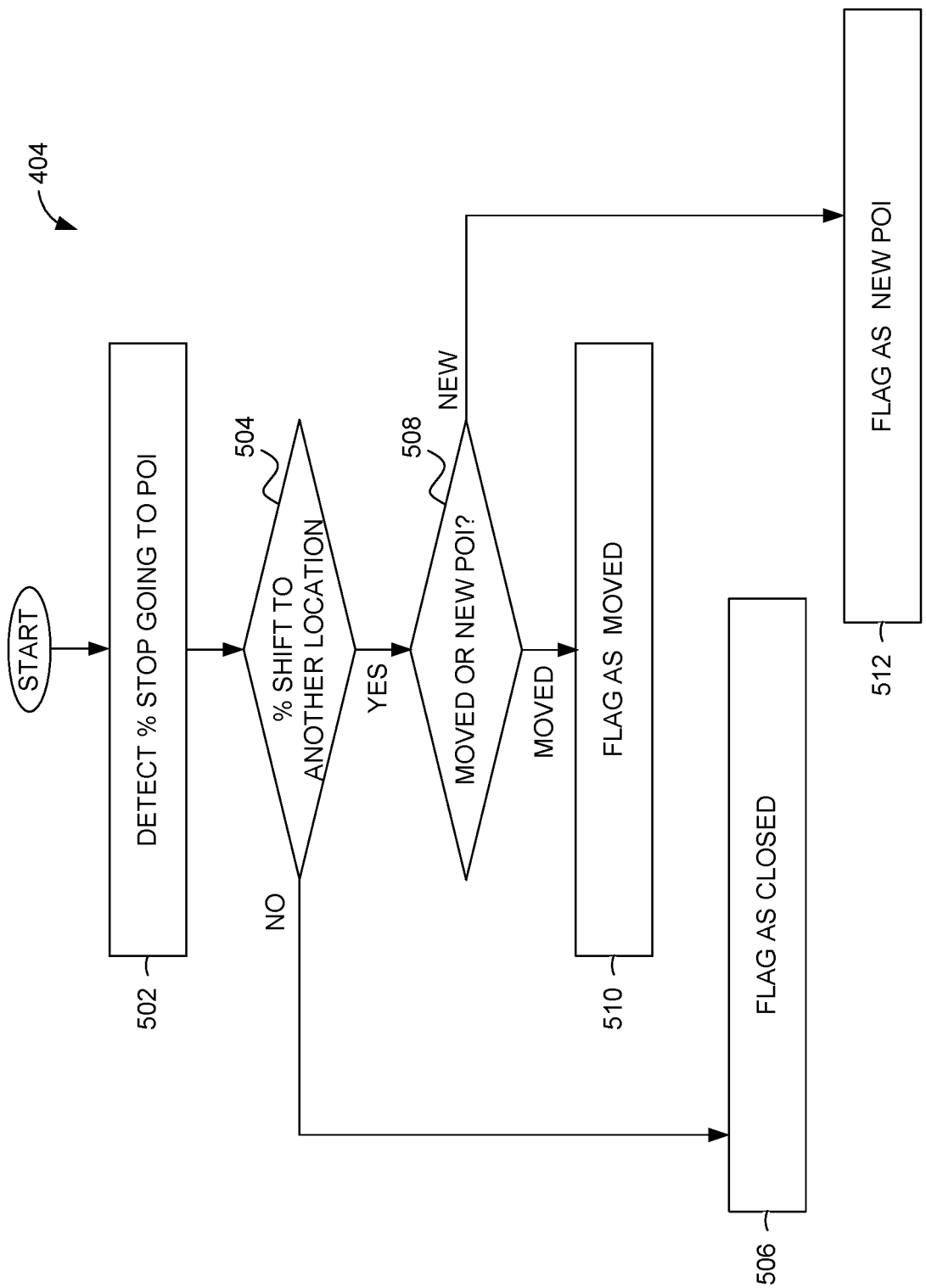
FIG. 5 is a flowchart illustrating operations for detecting and flagging status changes in a POI, according to some example embodiments.

FIG. 5 is a flowchart illustrating operations of a method (e.g., operation 404) for detecting change in trip behavior for a POI and determining a status based on the detected change in trip behavior, according to some example embodiments. Operations in the method 500 may be performed by the networked system 102, using components (e.g., monitoring module 220) described above with respect to FIG. 2. Accordingly, the method 500 is described by way of example with reference to the networked system 102. However, it shall be appreciated that at least some of the operations of the method 500 may be deployed on various other hardware configurations or be performed by similar components residing elsewhere in the network environment 100. Therefore, the method 500 is not intended to be limited to the networked system 102.

In operation 502, the monitoring module 220 detects a percentage of the cohort that has stopped going to the POI associated with the cohort. In example embodiments, the monitoring module 220 determines that the trip behavior (e.g., frequency of trips by the cohorts over time) has changed. Specifically, the monitoring module 220 determines that a threshold number of users in the cohort have stopped going to the POI.

In operation 504, a determination is made by the monitoring module 220 whether a threshold number of the users that have stopped going to the POI are collectively going to a second location (e.g., shifted to another location). If a threshold percentage of users in the cohort are not collectively going to a second location, then the POI is flagged by the monitoring module 220 as being closed in operation 506.

However, if a threshold percentage or amount of the users in the cohort are collectively going to a second location, then a determination is made in operation 508 as to whether the second location is a new location for the POI (e.g., the POI has moved) or if the second location is a new (and possibly competing) POI. The second location is considered to be a new location for the POI if a large number of users have stopped going to an original location of the POI and a similar number of users are now traveling to the second location. In this case, the POI is flagged as moved in operation 510.

Alternatively, if a threshold percentage or amount of users of the cohort are traveling to the second location, but a large percentage or amount of users of the cohort are still traveling to the original location of the POI, then the monitoring module 220 determines that the second location is associated with a new POI. In some embodiments, the new POI may be a competing business to the original POI.

The thresholds used to determine whether the POI is closed or moved, or whether a new POI is opened may be default, set by a user, or machine-learned. For example, a machine learning model can be trained to determine thresholds based on historical data. Further still, the thresholds used can be different for each POI. For example, for some types of places, a 10% change is a high enough threshold to indicate a change in trip behavior, while for other POIs, it may be a lot higher. Different POIs will have different trip behaviors of the cohort as well. For example, for a large building with a lot of businesses, a lower percentage threshold (e.g., 10%) is meaningful because this lower percentage going to one particular place in the building is now going to a different place. Additionally, if the users are searching by address (instead of a name of the POI), a lower threshold or weight is used because a building corresponding to the address can have a plurality of different businesses in it. Conversely, if users are searching by POI name, then a higher threshold or weight would apply.

FIG. 6A-FIG. 6C are example user interfaces used to elicit user generated content in a verification process. For example, if the networked system 102 (e.g., the verification module 210) detects that a user wants to go to the POI (e.g., by entering the name of the POI or an address) being verified, the networked system 102 provides a user interface to query the user whether the POI is a new location for the POI (FIG. 6A) or whether the location is a new type of business (e.g., that competes with another POI; FIG. 6B).

FIG. 6C is an example user interface used to elicit user generated content for verification that a POI has closed. The user interface of FIG. 6C may be provided to a user (e.g., a user at a user device 106) that, for examples, has previously had a trip (or a threshold number of trips) to the POI.

Various thresholds (e.g., frequency threshold, threshold percentage) are discussed herein. In example embodiments, the thresholds may be based on heuristics or a machine-learned model based on observed past data (e.g., stored in the data storage 204). In some embodiments, the thresholds are determined based on a precision/recall that is desired. For example, behavior of prediction models is tuned (e.g., threshold to be used) based on how many cases it can predict (e.g., recall) and how many of those predictions are correct (e.g., precision). Thus, for example, the networked system 102 can lower the threshold for flagging a change and get more cases to investigate. However, many of the cases may not be true (e.g., false positive). This is an example of a high recall but low precision system. Alternatively, for example, the networked system can tune the threshold such that only changes which are most certainly true, get flagged (e.g., if all or nearly all cohort members stop going to a first POI and then all of them go to a second POI). This would be a rare case (e.g., low recall) but very likely true (e.g., high precision).

Figure 7:
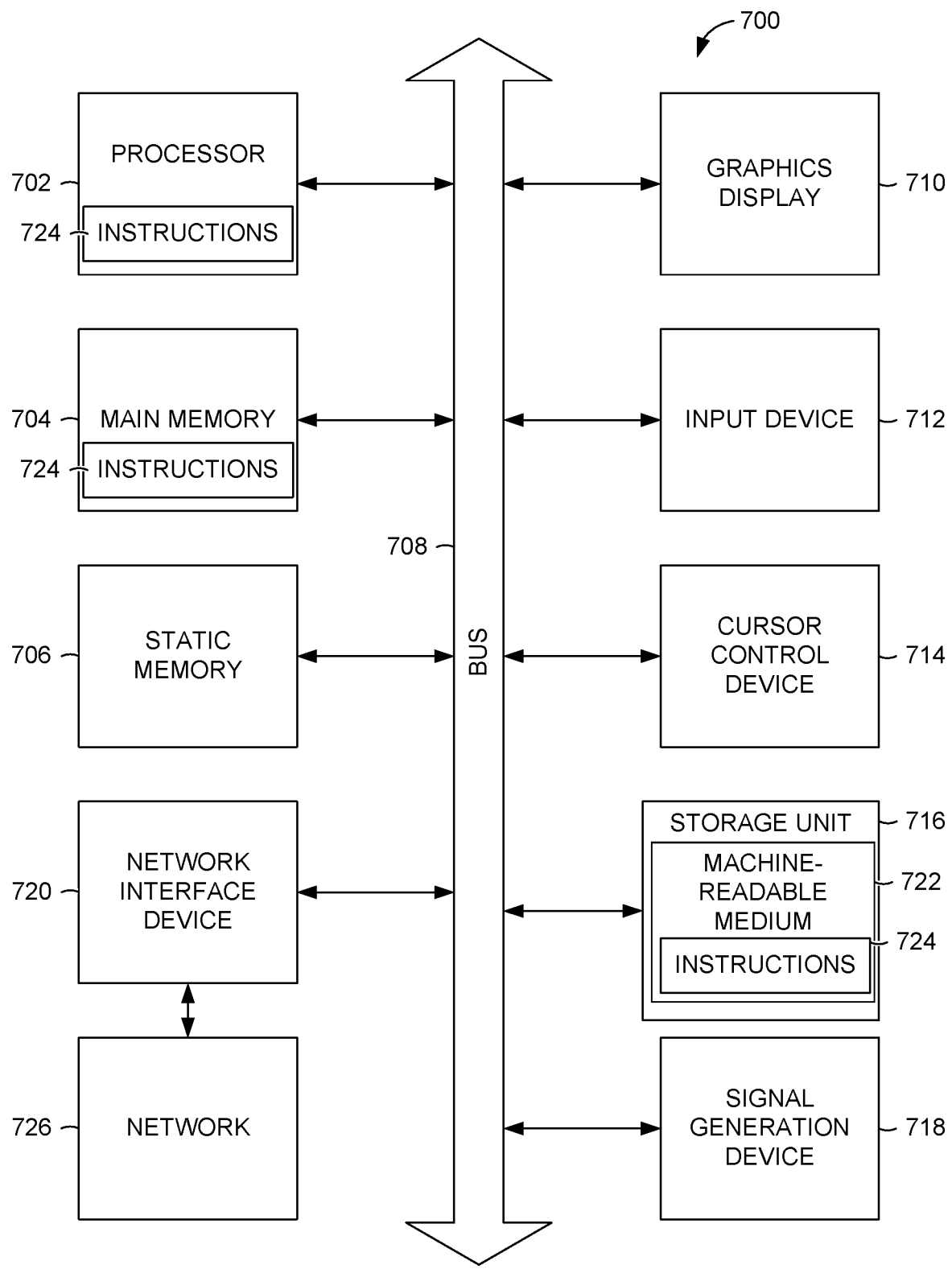
FIG. 7 is a block diagram illustrating components of a machine, according to some example embodiments, able to read instructions from a machine-readable medium and perform any one or more of the methodologies discussed herein.

FIG. 7 illustrates components of a machine 700, according to some example embodiments, that is able to read instructions from a machine-readable medium (e.g., a machine-readable storage device, a non-transitory machine-readable storage medium, a computer-readable storage medium, or any suitable combination thereof) and perform any one or more of the methodologies discussed herein. Specifically, FIG. 7 shows a diagrammatic representation of the machine 700 in the example form of a computer device (e.g., a computer) and within which instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 3-5. In one embodiment, the instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724 (sequentially or otherwise) that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, or a cathode ray tube (CRT), or any other display capable of displaying graphics or video). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a sound card, an amplifier, a speaker, a headphone jack, or any suitable combination thereof), and a network interface device 720.

The storage unit 716 includes a machine-readable medium 722 (e.g., a tangible machine-readable storage medium) on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered as machine-readable media (e.g., tangible and non-transitory machine-readable media). The instructions 724 may be transmitted or received over a network 726 via the network interface device 720.

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 704, 706, and/or memory of the processor(s) 702) and/or storage unit 716 may store one or more sets of instructions and data structures (e.g., software) 724 embodying or utilized by any one or more of the methodologies or functions described herein. These instructions, when executed by processor(s) 702 cause various operations to implement the disclosed embodiments.

As used herein, the terms "machine-storage medium," "device-storage medium," "computer-storage medium" (referred to collectively as "machine-storage medium 722") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 722 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 722 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media.

Thus, the terms include both storage devices/media and carrier waves/modulated data signals.

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a system for maintaining a current database of POI by automatically detecting a change associated with a POI based on cohort analysis. The system includes one or more processors and a memory storing instructions that, when executed by the one or more hardware processors, causes the one or more hardware processors to perform operations comprising accessing and analyzing trip data associated with a point of interest (POI); using the analyzed trip data, generating a cohort associated with the POI; detecting a change in trip behavior in the cohort associated with the POI; and in response to detecting the change in trip behavior, updating a database in a data store to indicate a status update.

In example 2, the subject matter of example 1 can optionally include wherein the analyzing the trip data comprises identifying the POI and a user traveling to the POI for each trip of the trip data; determining that the user traveled to the POI at a frequency that exceeds a frequency threshold; and in response to the determining, tying the user to the POI in a database.

In example 3, the subject matter of examples 1-2 can optionally include wherein the generating the cohort comprises grouping together users tied to the POI.

In example 4, the subject matter of examples 1-3 can optionally include wherein the detecting the change comprises detecting that a threshold number of users in the cohort stopped going to a location corresponding to the POI.

In example 5, the subject matter of examples 1-4 can optionally include wherein the detecting the change comprises determining whether a threshold percentage of the threshold number of users is traveling to a second location; and the updating the database comprises updating a data structure to indicate that the POI is closed based on the determining that the threshold percentage of the threshold number of users is not traveling to the second location, In example 6, the subject matter of examples 1-5 can optionally include wherein the detecting the change comprises determining that a threshold percentage of the threshold number of users is traveling to a second location; and determining whether the second location is a new location for the POI or whether the second location is associated with a new POI, the determining whether the second location is associated with the new POI comprising detecting that a portion of the cohort is still traveling to the location corresponding to the POI.

In example 7, the subject matter of examples 1-6 can optionally include wherein the updating the database comprises including the new POI in the database based on the determining that the second location is associated with the new POI.

In example 8, the subject matter of examples 1-7 can optionally include wherein the updating the database comprises flagging the POI with an indication of a status change, the flagging comprising indicating that the POI has moved, indicating that the POI has closed, or indicating that a new POI in a same category as the POI has opened.

In example 9, the subject matter of examples 1-8 can optionally include wherein the updating the database comprises changing location data for the POI in the database based on detecting that the POI has moved.

In example 10, the subject matter of examples 1-9 can optionally include wherein the operations further comprise, in response to the detecting the change, triggering a verification process to verify the status update.

Example 11 is a method for maintaining a current database of POI by automatically detecting a change associated with a POI based on cohort analysis. The method comprises accessing and analyzing trip data associated with a point of interest (POI); using the analyzed trip data, generating, by one or more hardware processors, a cohort associated with the POI; detecting a change in trip behavior in the cohort associate with the POI; and in response to detecting the change in trip behavior, updating a database in a data store to indicate a status update.

In example 12, the subject matter of example 11 can optionally include wherein the analyzing the trip data comprises identifying the POI and a user traveling to the POI for each trip of the trip data; determining that the user traveled to the POI at a frequency that exceeds a frequency threshold; and in response to the determining, tying the user to the POI in a database.

In example 13, the subject matter of examples 11-12 can optionally include wherein the generating the cohort comprises grouping together users tied to the POI.

In example 14, the subject matter of examples 11-13 can optionally include wherein the detecting the change comprises detecting that a threshold number of users in the cohort stopped going to a location corresponding to the POI.

In example 15, the subject matter of examples 11-14 can optionally include wherein the detecting the change comprises determining whether a threshold percentage of the threshold number of users is traveling to a second location; and the updating the database comprises updating a data structure to indicate that the POI is closed based on the determining that the threshold percentage of the threshold number of users is not traveling to the second location.

In example 16, the subject matter of examples 11-15 can optionally include wherein the detecting the change comprises determining that a threshold percentage of the threshold number of users is traveling to a second location; and determining whether the second location is a new location for the POI or whether the second location is associated with a new POI, the determining whether the second location is associated with the new POI comprising detecting that a portion of the cohort is still traveling to the location corresponding to the POI.

In example 17, the subject matter of examples 11-16 can optionally include wherein the updating the database comprises flagging the POI with an indication of a status change, the flagging comprising indicating that the POI has moved, indicating that the POI has closed, or indicating that a new POI in a same category as the POI has opened.

In example 18, the subject matter of examples 11-17 can optionally include, in response to the detecting the change, triggering a verification process to verify the change.

Example 19 is a machine-storage medium for maintaining a current database of POI by automatically detecting a change associated with a POI based on cohort analysis. The machine-storage medium configures one or more processors to perform operations comprising accessing and analyzing trip data associated with a point of interest (POI); using the analyzed trip data, generating a cohort associated with the POI; detecting a change in trip behavior in the cohort associated with the POI; and in response to detecting the change in the trip behavior, updating a database in a data store to indicate a status update.

In example 20, the subject matter of example 19 can optionally include wherein the operations further comprise, in response to the detecting the change, triggering a verification process to verify the status update.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A system comprising:
one or more hardware processors; and
a memory storing instructions that, when executed by the one or more hardware processors, causes the one or more hardware processors to perform operations comprising:
training, based on historical trip data, a machine-learning model to determine machine-learned thresholds for detecting changes in trip behavior;
accessing and analyzing trip data associated with a point of interest (POI);
using the analyzed trip data, generating a cohort associated with the POI;
detecting, based on one or more of the machine-learned thresholds, a change in trip behavior in the cohort associated with the POI; and
based on the detecting the change in trip behavior, updating a database in a data store to indicate a status update for the POI.

2. The system of claim 1, wherein the analyzing the trip data comprises:
identifying the POI and a user traveling to the POI for each trip of the trip data;
determining that the user traveled to the POI at a frequency that exceeds a frequency threshold of the machine-learned thresholds; and
based on the determining that the user traveled to the POI at a frequency that exceeds the frequency threshold, tying the user to the POI in the data store.

3. The system of claim 2, wherein the generating the cohort comprises grouping together users tied to the POI.

4. The system of claim 1, wherein the detecting the change comprises detecting that a threshold number of users in the cohort stopped going to a location corresponding to the POI.

5. The system of claim 4, wherein:
the detecting the change comprises determining whether a threshold percentage of the threshold number of users is traveling to a second location; and
the updating the database comprises updating a data structure to indicate that the POI is closed based on the determining that the threshold percentage of the threshold number of users is not traveling to the second location.

6. The system of claim 4, wherein the detecting the change comprises:
detecting that a portion of the cohort is still traveling to the location corresponding to the POI while a threshold percentage of the threshold number of users that have stopped traveling to the POI is traveling to a second location; and
determining that the second location is associated with a new POI based on the detecting that the portion of the cohort is still traveling to the location corresponding to the POI while the threshold percentage of the threshold number of users is traveling to the second location.

7. The system of claim 6, wherein the updating the database comprises including the new POI in the database based on the determining that the second location is associated with the new POI.

8. The system of claim 1, wherein the updating the database comprises flagging the POI with an indication of a status change, the flagging comprising indicating that the POI has moved, indicating that the POI has closed, or indicating that a new POI in a same category as the POI has opened.

9. The system of claim 1, wherein the updating the database comprises changing location data for the POI in the database based on detecting that the POI has moved.

10. The system of claim 1, wherein the operations further comprise, in response to the detecting the change, triggering a verification process to verify the status update, the verification process including causing presentation of a verification user interface on devices of members of the cohort.

11. A method comprising:
training, based on historical trip data, a machine-learning model to determine machine-learned thresholds for detecting changes in trip behavior;
accessing and analyzing trip data associated with a point of interest (POI);
using the analyzed trip data, generating, by one or more hardware processors, a cohort associated with the POI;
detecting, based on one or more of the machine-learned thresholds, a change in trip behavior in the cohort associated with the POI; and
based on the detecting the change in trip behavior, updating a database in a data store to indicate a status update for the POI.

12. The method of claim 11, wherein the analyzing the trip data comprises:
identifying the POI and a user traveling to the POI for each trip of the trip data;
determining that the user traveled to the POI at a frequency that exceeds a frequency threshold of the machine-learned thresholds; and
based on the determining that the user traveled to the POI at a frequency that exceeds the frequency threshold, tying the user to the POI in the data store.

13. The method of claim 12, wherein the generating the cohort comprises grouping together users tied to the POI.

14. The method of claim 11, wherein the detecting the change comprises detecting that a threshold number of users in the cohort stopped going to a location corresponding to the POI.

15. The method of claim 14, wherein:
the detecting the change comprises determining whether a threshold percentage of the threshold number of users is traveling to a second location; and
the updating the database comprises updating a data structure to indicate that the POI is closed based on the determining that the threshold percentage of the threshold number of users is not traveling to the second location.

16. The method of claim 14, wherein the detecting the change comprises:
- detecting that a portion of the cohort is still traveling to the location corresponding to the POI while a threshold percentage of the threshold number of users that have stopped traveling to the POI is traveling to a second location; and
- determining that the second location is associated with a new POI based on the detecting that the portion of the cohort is still traveling to the location corresponding to the POI while the threshold percentage of the threshold number of users is traveling to the second location.

17. The method of claim 11, wherein the updating the database comprises flagging the POI with an indication of a status change, the flagging comprising indicating that the POI has moved, indicating that the POI has closed, or indicating that a new POI in a same category as the POI has opened.

18. The method of claim 11, further comprising, in response to the detecting the change, triggering a verification process to verify the status update, the verification process including causing presentation of a verification user interface on devices of members of the cohort.

19. A machine-storage medium storing instructions that, when executed by one or more processors of a machine, cause the one or more processors to perform operations comprising:
- training, based on historical trip data, a machine-learning model to determine machine-learned thresholds for detecting changes in trip behavior;
- accessing and analyzing trip data associated with a point of interest (POI);
- using the analyzed trip data, generating a cohort associated with the POI;
- detecting, based on one or more of the machine-learned thresholds, a change in trip behavior in the cohort associated with the POI; and
- based on the detecting the change in trip behavior, updating a database in a data store to indicate a status update for the POI.

20. The machine-storage medium of claim 19, wherein the operations further comprise, in response to the detecting the change, triggering a verification process to verify the status update, the verification process including causing presentation of a verification user interface on devices of members of the cohort.

* * * * *